(12) United States Patent
Santi et al.

(10) Patent No.: US 8,262,140 B2
(45) Date of Patent: Sep. 11, 2012

(54) THREADED JOINT WITH IMPROVED RESILIENT SEAL RING

(75) Inventors: Nestor J. Santi, Buenos Aires (AR); Gaston Mazzaferro, Buenos Aires (AR); Alfredo Francisco Quiroga, Buenos Aires (AR)

(73) Assignee: Tenaris Connections Limited, Kingstown (VC)

( * ) Notice: Subject to any disclaimer, the term of this patent is extended or adjusted under 35 U.S.C. 154(b) by 117 days.

(21) Appl. No.: 12/920,085

(22) PCT Filed: Feb. 27, 2009

(86) PCT No.: PCT/EP2009/052388
§ 371 (c)(1),
(2), (4) Date: Aug. 27, 2010

(87) PCT Pub. No.: WO2009/106623
PCT Pub. Date: Sep. 3, 2009

(65) Prior Publication Data
US 2011/0008101 A1 Jan. 13, 2011

(30) Foreign Application Priority Data
Feb. 29, 2008 (EP) .................................. 08102184

(51) Int. Cl.
*F16L 17/00* (2006.01)
(52) U.S. Cl. ...................................... 285/355; 285/332.2
(58) Field of Classification Search .................. 285/390, 285/355, 333, 334, 332.2, 351
See application file for complete search history.

(56) References Cited

U.S. PATENT DOCUMENTS

| | | | |
|---|---|---|---|
| 1,671,458 A | 5/1928 | Wilson | |
| 1,999,706 A | * 4/1935 | Spang | 285/116 |
| 2,075,427 A | 3/1937 | Church | |
| 2,211,173 A | 8/1940 | Shaffer | |
| 2,487,241 A | 11/1949 | Hilton | |
| 2,631,871 A | 3/1953 | Stone | |
| 2,992,613 A | 7/1961 | Bodine | |
| 3,054,628 A | 9/1962 | Hardy et al. | |
| 3,307,860 A | 3/1967 | Blount et al. | |
| 3,489,437 A | 1/1970 | Duret | |
| 3,572,777 A | 3/1971 | Blose et al. | |

(Continued)

FOREIGN PATENT DOCUMENTS

AT     388791     8/1989

(Continued)

OTHER PUBLICATIONS

U.S. Appl. No. 13/072,533, filed Mar. 25, 2011, Della Pina et al.
U.S. Appl. No. 13/073,917, filed Mar. 28, 2011, Carcagno et al.
American Petroleum Institute, Specification 5B, Apr. 2008, 15th Edition (Excerpts Only).

(Continued)

*Primary Examiner* — Aaron Dunwoody
(74) *Attorney, Agent, or Firm* — Knobbe, Martens, Olson & Bear, LLP (57) ABSTRACT

A threaded joint includes a first seal ring having a tapered shape in a cross section on an axial plane, this ring having an L-shaped metal reinforcement ring embedded in it. The threaded joint can also include a second seal ring positioned more internal to the first seal ring and located in a housing between the end of a threaded section and the nose of the box. The second seal ring has a first base, a second base axially opposite to the first base, and protruding annular ribs either on the external surface or on an internal surface.

20 Claims, 5 Drawing Sheets

U.S. PATENT DOCUMENTS

| | | | |
|---|---|---|---|
| 3,810,793 A | 5/1974 | Heller |
| 3,889,989 A | 6/1975 | Legris et al. |
| 4,299,412 A | 11/1981 | Parmann |
| 4,373,750 A | 2/1983 | Mantelle et al. |
| 4,384,737 A | 5/1983 | Reusser |
| 4,406,561 A | 9/1983 | Ewing |
| 4,475,839 A | 10/1984 | Strandberg |
| 4,570,982 A | 2/1986 | Blose et al. |
| 4,591,195 A | 5/1986 | Chelette et al. |
| 4,602,807 A | 7/1986 | Bowers |
| 4,623,173 A | 11/1986 | Handa et al. |
| 4,662,659 A | 5/1987 | Blose et al. |
| 4,688,832 A | 8/1987 | Ortloff et al. |
| 4,706,997 A | 11/1987 | Carstensen |
| 4,762,344 A | 8/1988 | Perkins et al. |
| 4,844,517 A | 7/1989 | Beiley et al. |
| 4,856,828 A | 8/1989 | Kessler et al. |
| 4,955,645 A | 9/1990 | Weems |
| 4,958,862 A | 9/1990 | Cappelli et al. |
| 4,988,127 A | 1/1991 | Cartensen |
| 5,007,665 A | 4/1991 | Bovisio et al. |
| 5,067,874 A | 11/1991 | Foote |
| 5,137,310 A | 8/1992 | Noel et al. |
| 5,180,008 A | 1/1993 | Aldridge et al. |
| 5,348,350 A | 9/1994 | Blose et al. |
| 5,515,707 A | 5/1996 | Smith |
| 5,712,706 A | 1/1998 | Castore et al. |
| 5,794,985 A | 8/1998 | Mallis |
| 5,810,401 A | 9/1998 | Mosing et al. |
| 6,070,912 A | 6/2000 | Latham |
| 6,173,968 B1 | 1/2001 | Nelson et al. |
| 6,349,979 B1 | 2/2002 | Noel et al. |
| 6,412,831 B1 | 7/2002 | Noel et al. |
| 6,447,025 B1 | 9/2002 | Smith |
| 6,481,760 B1 | 11/2002 | Noel et al. |
| 6,494,499 B1 | 12/2002 | Galle, Sr. et al. |
| 6,550,822 B2 | 4/2003 | Mannella et al. |
| 6,557,906 B1 | 5/2003 | Carcagno |
| 6,752,436 B1 | 6/2004 | Verdillon |
| 6,755,447 B2 | 6/2004 | Galle, Jr. et al. |
| 6,764,108 B2 | 7/2004 | Ernst et al. |
| 6,851,727 B2 | 2/2005 | Carcagno et al. |
| 6,857,668 B2 * | 2/2005 | Otten et al. ............ 285/334 |
| 6,905,150 B2 | 6/2005 | Carcagno et al. |
| 6,921,110 B2 | 7/2005 | Morotti et al. |
| 6,991,267 B2 | 1/2006 | Ernst et al. |
| 7,014,223 B2 | 3/2006 | Della Pina et al. |
| 7,066,499 B2 | 6/2006 | Della Pina et al. |
| 7,108,063 B2 | 9/2006 | Carstensen |
| 7,255,374 B2 | 8/2007 | Carcagno et al. |
| 7,431,347 B2 | 10/2008 | Ernst et al. |
| 7,464,449 B2 | 12/2008 | Santi et al. |
| 7,475,476 B2 * | 1/2009 | Roussie ............ 29/890.14 |
| 7,506,900 B2 | 3/2009 | Carcagno et al. |
| 7,621,034 B2 * | 11/2009 | Roussie ............ 29/456 |
| 7,735,879 B2 | 6/2010 | Toscano et al. |
| 7,753,416 B2 | 7/2010 | Mazzaferro et al. |
| 2003/0168859 A1 | 9/2003 | Watts |
| 2004/0118490 A1 | 6/2004 | Klueh et al. |
| 2004/0118569 A1 | 6/2004 | Brill et al. |
| 2005/0093250 A1 | 5/2005 | Santi et al. |
| 2005/0166986 A1 | 8/2005 | Dell'erba et al. |
| 2006/0006600 A1 | 1/2006 | Roussie |
| 2006/0273586 A1 | 12/2006 | Reynolds, Jr. et al. |
| 2007/0039149 A1 | 2/2007 | Roussie |
| 2008/0303274 A1 | 12/2008 | Mazzaferro et al. |
| 2010/0181727 A1 | 7/2010 | Santi et al. |
| 2010/0181761 A1 | 7/2010 | Santi et al. |
| 2010/0187808 A1 | 7/2010 | Santi |
| 2011/0041581 A1 | 2/2011 | Santi |
| 2011/0042946 A1 | 2/2011 | Santi |
| 2011/0133449 A1 | 6/2011 | Mazzaferro |
| 2011/0233925 A1 | 9/2011 | Pina |
| 2011/0233926 A1 | 9/2011 | Carcagno |
| 2012/0032435 A1 | 2/2012 | Carcagno |

FOREIGN PATENT DOCUMENTS

| | | |
|---|---|---|
| CA | 2319926 | 7/2008 |
| DE | 3310226 | 10/1984 |
| EP | 0 032 265 | 7/1981 |
| EP | 0 104 720 | 4/1984 |
| EP | 0 159 385 | 10/1985 |
| EP | 0 309 179 | 3/1989 |
| EP | 0340385 | 11/1989 |
| EP | 0989196 | 3/2000 |
| EP | 1 065 423 | 1/2001 |
| EP | 1277848 | 1/2003 |
| EP | 1296088 | 3/2003 |
| EP | 1 362 977 | 11/2003 |
| EP | 1705415 | 9/2006 |
| EP | 1726861 | 11/2006 |
| FR | 1149513 | 12/1957 |
| FR | 2704042 | 10/1994 |
| FR | 2848282 | 6/2004 |
| GB | 1 398 214 | 6/1973 |
| GB | 1 428 433 | 3/1976 |
| GB | 2276647 | 10/1994 |
| GB | 2388169 | 11/2003 |
| JP | 58-187684 | 12/1983 |
| JP | 07-139666 | 5/1995 |
| WO | WO 84/02947 | 8/1984 |
| WO | WO 94/29627 | 12/1994 |
| WO | WO 96/22396 | 7/1996 |
| WO | WO 00/06931 | 2/2000 |
| WO | WO 01/75345 | 10/2001 |
| WO | WO 02/29290 | 4/2002 |
| WO | WO 02/35128 | 5/2002 |
| WO | WO 02/068854 | 9/2002 |
| WO | WO 02/086369 | 10/2002 |
| WO | WO 02/093045 | 11/2002 |
| WO | WO 03/087646 | 10/2003 |
| WO | WO 2004/033951 | 4/2004 |
| WO | WO 2004/053376 | 6/2004 |
| WO | WO 2006/087361 | 4/2006 |
| WO | WO 2007/002576 | 1/2007 |
| WO | WO 2007/017161 | 2/2007 |
| WO | WO 2007/063079 | 6/2007 |
| WO | WO 2008/090411 | 7/2008 |
| WO | WO 2009/000851 | 12/2008 |
| WO | WO 2009/000766 | 1/2009 |
| WO | WO 2009/010507 | 1/2009 |
| WO | WO 2009/027308 | 3/2009 |
| WO | WO 2009/027309 | 3/2009 |
| WO | WO 2009/106623 | 9/2009 |
| WO | WO 2010/122431 | 10/2010 |

OTHER PUBLICATIONS

International Preliminary Report on Patentability dated Feb. 3, 2010 from PCT Application No. PCT/EP2009/052388.

International Written Opinion dated May 19, 2009 from PCT Application No. PCT/EP2009/052388.

Chang, L.C., "Microstructures and reaction kinetics of bainite transformation in Si-rich steels," XP0024874, Materials Science and Engineering, vol. 368, No. 1-2, Mar. 15, 2004, pp. 175-182, Abstract, Table 1.

International Search Report as mailed on Aug. 25, 2008 in PCT Application No. PCT/EP2008/058073.

International Search Report as mailed on Jan. 5, 2009 in PCT Application No. PCT/EP2008/060936.

International Search Report as mailed on Nov. 5, 2008 in PCT Application No. PCT/EP2008/059226.

International Search Report as mailed on Oct. 31, 2008 in PCT Application No. PCT/EP2008/057861.

International Search Report as mailed on Aug. 8, 2008 in PCT Application No. PCT/EP2007/062492.

International Search Report as mailed on Jan. 14, 2009 in PCT Application No. PCT/EP2008/060935.

International Search Report as mailed on May 19, 2009 in PCT Application No. PCT/EP2009/052388.

International Search Report dated Sep. 27, 2010 from PCT Application No. PCT/IB/2010/001603.

* cited by examiner

Fig. 6

THREADED JOINT WITH IMPROVED RESILIENT SEAL RING

CROSS-REFERENCE TO RELATED APPLICATIONS

This application is a U.S. National Phase of PCT International Application No. PCT/EP2009/052388, filed Feb. 27, 2009, and published as WO 2009/106623 on Sep. 3, 2009 which claims priority to European Application No. 08102184.2, filed Feb. 29, 2008. The disclosure of both prior applications is incorporated by reference in their entirety and should be considered a part of this specification.

FIELD OF THE INVENTION

The present invention relates to threaded joints, in particular for connecting tubes of predefined length to make strings used in the hydrocarbon industry especially for use in the field of OCTG (Oil Country Tubular Goods) and in line pipes in offshore applications.

BACKGROUND OF THE INVENTION

Searching for oil or, more generally, hydrocarbons has become more demanding in terms of hardware and devices in recent years because oil and gas fields or reservoirs are located deeper under the earth's surface or in places difficult to reach below the sea bed. Prospecting for an exploitation of hydrocarbon fields demands hardware which is more resistant to environmental challenges such as higher loads and corrosion, which were less important in the past.

Modern joints are generally designed with metal to metal seals made by the contact between two surfaces, positioned usually either at one end or at both ends of the threaded portion of the joint. The two contact surfaces reciprocally interfere in the elastic range of the modulus of elasticity for an appropriate stress magnitude. However in specific situations, resilient seals are needed instead of or in combination with metallic seals to prevent penetration of external fluids in the interstices of the threads.

It is therefore a design requirement that the joint seals resist penetration of the external fluids, or at least do not allow continuous exchange of fluids that have already penetrated the joint with the surrounding fluids, in order to reduce corrosion rate of the joint.

To solve the mentioned problems various solutions have been suggested, one of which consists of inserting a seal ring made of polymeric material, e.g. an O-ring, at the extremity of the joint near the threaded portion.

It is a widespread practice to use O-rings pre-mounted onto the box, but this practice has an important disadvantage: the seal rings can be damaged during mounting of the ring and/or during make-up.

As such seals are usually pre-mounted onto the box, when making up the box the seal is dragged together with the box over the pin's threads. Due to the diametrical interferences needed between pin, box and seal dimensions for the seals to work properly, along with the geometric parameters of the connection such as thread profile, pitch, taper angle, stab angle, etc, the seals are inevitably forced to crawl over the pin's threads, causing damage to the lower surfaces of the seals or permanent deformations to the seal which would jeopardize the sealing efficiency during operation.

Seal rings having more complicated shape have also been proposed, e.g. rings with an "H" or "U"-shaped cross section to increase efficiency and prevent sea water from penetrating into the gaps of the joint. However such seal rings are subject to such stresses and adverse environmental conditions, both during the initial make-up operation and during operational life, that their efficiency is much reduced after some time. Even though pre-mounting on the pin would be less harmful for the seal ring, some field applications require seal rings of simpler shape which must be pre-mounted onto the box.

U.S. Pat. No. 6,550,822 discloses a threaded joint including a water exclusion seal which is a pressure energized elastomeric seal positioned in a groove near each end of the joint to make a radial seal between the unthreaded area at each end of the joint and the unthreaded cylindrical area adjacent each end of the tubular section.

The shape of the ring section does not facilitate its dragging over the thread during make up. Because of this shape, the sharp corners hit the thread crests and are prone to get stuck in the thread. In case of joint break-out it becomes even more likely to damage the seal ring.

In case of failure, the portion of the pin with the vanishing thread remains unprotected against possible external corrosive fluids, since dope used to lubricate the joint is easily washed away by the infiltrating external fluid.

This joint uses standard seal rings available on the market. Therefore, the same ring design must be used under different connections, and does not make it easy to customise the ring geometry for each pin taper, stab angle, thread height and pitch, etc.

The cavity located between the lips renders the housing fragile, making it prone to rupture during break-out of the joint, when the lower part of the housing is dragged over the pin's threads, producing such a high deformation as to break it.

There have been many attempts to design improved configurations for seal rings to be housed in the vicinity of the nose of the box, but all are insufficient to withstand the higher requirements set for current joints.

SUMMARY OF THE INVENTION

It is therefore an object of the present invention to provide a threaded joint which overcomes the aforementioned drawbacks.

The principal object of the present invention is to provide a joint having two innovative seal rings ensuring both a simple and reliable initial make-up and a high sealing efficiency during operation, particularly resistant to infiltrations of corrosive external fluids.

The above mentioned object is achieved in accordance with the present invention by means of a threaded joint that comprises a male threaded pipe, defined as the pin, a female threaded pipe, defined as the box, the pin being configured to be made up in the box, pin and box defining a common longitudinal axis, a first seal ring and a second seal ring interposed between the pin and the box, and located in a portion of the surface of the box between the end of a threaded portion and the nose of the box, and being in tight sealing contact by means of respective radially external surfaces on one side with an internal surface of the box and by means of respective radially internal surfaces with an external surface of the pin, the internal surface of the box being provided with a first recess made in proximity of the nose of the box for housing the first seal ring and with a second recess made in its thickness for housing the second seal ring placed between the first recess and the threaded portion of the box.

The joint according to the invention has two seal rings of novel design which ensure optimal sealability under particularly adverse operative conditions: the second or internal seal ring protects the threaded portions of the joint; the first or external seal ring protects in turn the second seal ring further improving the protection of the joint.

Also reusability of the seal rings is ensured because of the shape of the contact surfaces of the seal rings with box and pin.

In any case the solution according to the invention is more reliable in cases where no spare O-rings are available. Contrary to joints having seals of the prior art, like O-rings with circular cross section or similar, the joint according to the invention does not cause damage to the seal rings during break-out. This has the advantage that the same seal rings can be used for a successive make up operation.

Another advantage of the invention is to provide a threaded joint more reliable in real field operative conditions, where reliability is crucial and a reduction in operative costs in terms of time and tasks is desirable.

The first seal ring, placed most externally to the joint, has a cross-sectional shape particularly suitable to be pushed like a wedge by the external fluid pressure deep into the space between the external lip of the box and the corresponding external surface of the pin, thereby improving the sealing capacity of the ring and consequently of the joint.

Advantageously, making the housing for the first seal ring in the internal surface of the box frustoconical in shape in the portion coming into contact with the first ring, with its taper toward the inside of the box, further enhances contact of the first seal ring with the metal surfaces, improving sealing capacity. It also ensures that, starting from a limit pressure, the seal ring fully fits into the annular space between the lip of the box and the facing pin external wall.

A further advantage is provided by embedding in the body of the first seal ring a reinforcement ring, preferably made of metal and with a L-shaped cross section. This ensures a limited and controlled deformation of the first seal ring under action of the external fluid pressure.

The cross section of the first seal ring can also have a U-shape, this enabling the seal ring to become wedged in the frustoconical housing, so maintaining an optimal sealing capacity.

In another embodiment, the first seal ring is provided with an annular rib in correspondence with its edge, the external surface of the pin region housing said first seal ring before make-up being provided with a corresponding annular recess or step in order to stably house the rib.

The housing for the second seal ring, placed internal to the joint with respect to the first seal ring, is configured to best match the shape of the second seal ring, and vice versa, whereby the second seal ring works synergistically with its housing both during and after make up. Various cross section shapes for the second seal ring are provided which can be selected in dependence of the external fluid pressure acting on the joint.

Advantageously, in a first embodiment of the second seal ring an improvement in the sealing capacity is achieved without increasing costs since the housing for the second seal ring in the joint according to the invention is easy to make and is not more complex or expensive to produce than the currently used groove configurations, which house standard O-rings of circular cross section.

In a second embodiment of the second seal ring, the V-sectioned mouth ensures a better contact of the ring with the surfaces of pin and box when external fluid pressure is exerted on that end even in the annular space between the first and second seal rings. The external protruding annular ribs, either on one or both of the internal and external surfaces, ensure a better specific pressure on the surfaces of pin and box to which they adhere. The seal ring internal surface ensures a good positioning and contact in the seal ring housing made on the pin external surface. Advantageously the provision of a reinforcement metal ring in the part of the body positioned more internally within the joint ensures that the second seal ring holds tight on the pin, creating a hoop tension.

In a third embodiment of the second seal ring, the reinforcement ring is firmly fitted in the V-sectioned mouth and the seal ring is also provided with its own annular rib, in correspondence with an edge of a base, suitable during make-up to engage between the internal surface of the box, underneath a shoulder, and the external surface of the pin in order to further improve sealing.

In the joint of the invention the first seal ring, in all its embodiments, is advantageously pre-mounted onto the pin, thus avoiding damage of this seal ring during make-up.

As to the second seal ring, in its second and third embodiments it is also pre-mounted on the pin before make-up. Besides, in these cases, the second seal ring provides additional overlapped or redundant sealing functions, which secure tightness of the whole joint, even when one of the functions is itself overcome by the external fluid.

In its first embodiment the second seal ring is pre-mounted in its housing on the internal wall of the box.

After completion of make up, the second seal ring, whichever of the embodiments is used, is retained in an annular housing by the inner surface of the box and the outer surface of the pin. This annular housing can also be provided with a finishing and a coating layer. The housing has a geometry especially designed to cooperate with the seal.

The joint of the invention needs only limited additional machining operations apart from the common threading operations.

The provision of a reinforcement ring, preferably embedded in the sealing rings in their various shapes, prevents twisting of the ring, renders make up operation easier, and assures easier overall handling and make up of the seal ring itself.

Advantageously a coating can be applied to the surfaces involved by the second seal ring for protecting the machined surface of the pin close to the vanishing thread region of the joint which is likely to be exposed to contact with corrosive external agents.

BRIEF DESCRIPTION OF THE DRAWINGS

The foregoing and other objects will become more readily apparent by referring to the following detailed description and the appended drawings in which:

FIG. 7 shows another seal ring of the joint of FIG. 4 in an unloaded position.

DETAILED DESCRIPTION

Throughout the description the surfaces of the different elements of the joint are called external or internal with respect to the joint axis A.

Figure 1:
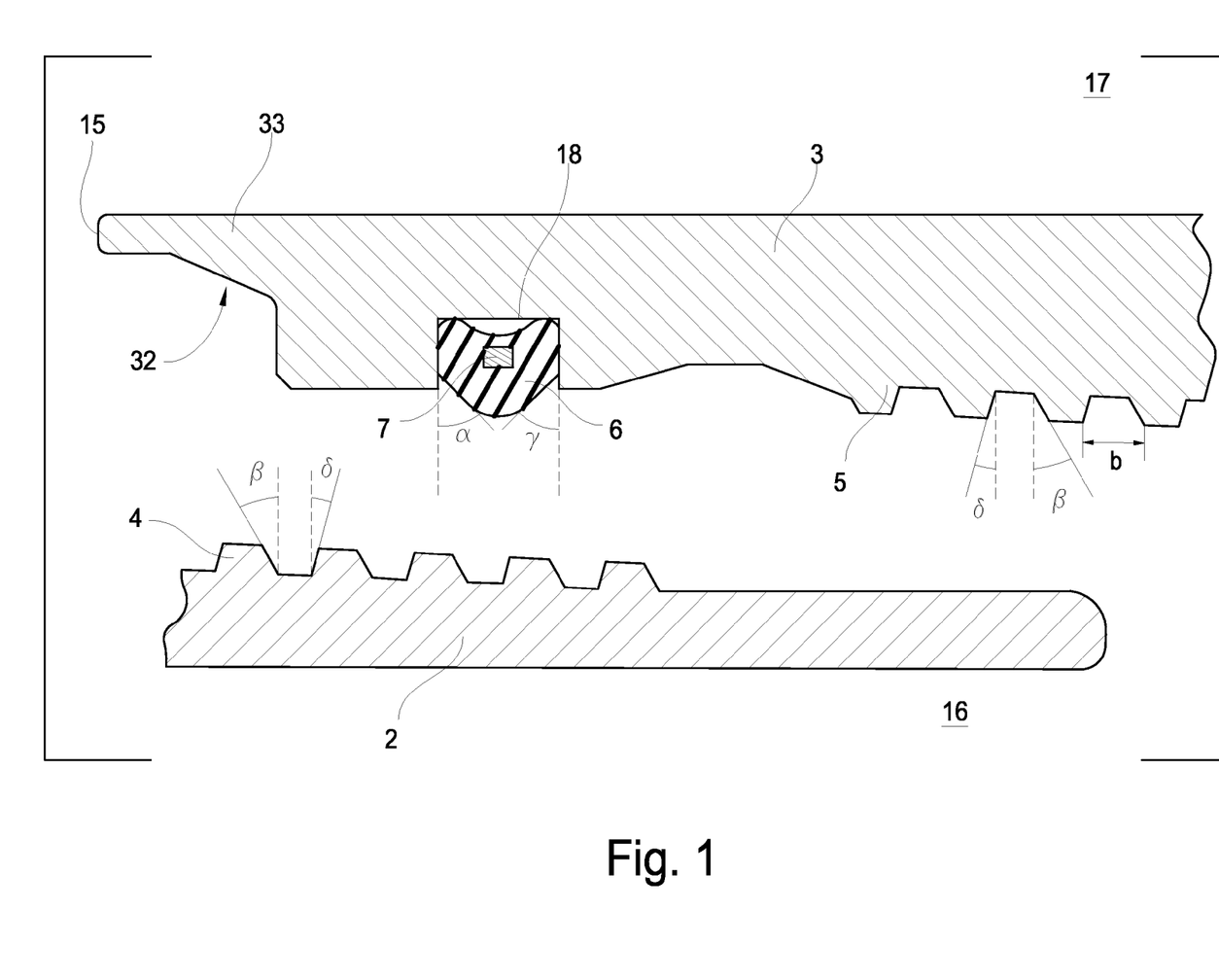
FIG. 1 shows a sectional view of the joint projected on an axial plane in accordance with the present invention before make-up with one seal ring premounted.
Figures 2, 3:
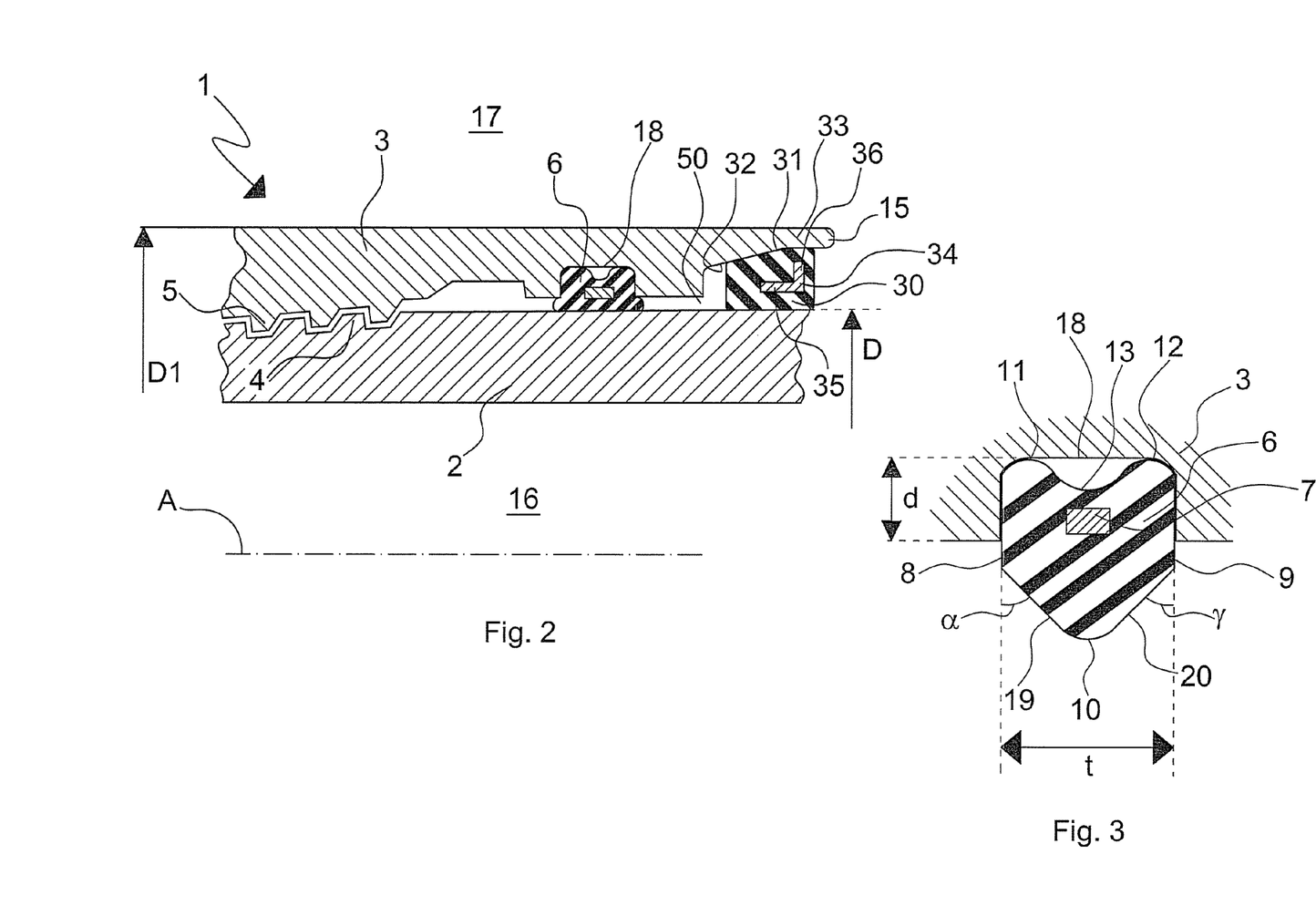
FIG. 2 shows a sectional view of the joint projected on an axial plane in accordance with the present invention after make up with two seal rings mounted.
FIG. 3 shows a sectional enlarged view of one seal ring of the joint of FIG. 1 in its unloaded position.

With particular reference to FIGS. 1 to 3, there is shown a first embodiment of a threaded joint, indicated overall by reference numeral 1, connecting two pipes together: a male pipe, commonly called pin 2, with a nominal external diameter D, and a female pipe also called box 3, with a nominal external diameter D1 equal to or greater than D.

The pin 2 has an external threaded portion 4 with male threads of appropriate profile, e.g. trapezoidal, the box 3 having an internal threaded portion 5 with female threads of profile complementary to that of the male threads.

The common axis of pin 2 and box 3 is indicated by A. The box 3 ends with a nose 15. The joint defines an inner space 16, containing the axis A of pin and box, in which the fluid, for example a hydrocarbon, such as natural gas or petroleum or other similar fluid, flows and an outer space 17 which can be in contact with fluids of various kinds such as sea water in some applications.

At the extremity of the box 3 there is located a first seal ring 30 of elastomeric material. The seal ring 30 has a frustoconical shape and its external surface 31 is tapered towards the internal part of the joint 1. The external surface 31 of the seal ring 30 matches the internal surface 32 of the lip 33 of the box 3, which has also a complementary frustoconical shape, for an appropriate length.

This particular shape allows the seal ring 30 to slide along the pin 2 under the pressure exerted by the external fluid in operation, from its position at the moment of insertion until a final resting position determined by the magnitude of said pressure and by the capacity of the seal ring 30 to compress its overall volume by virtue of the counterpressure exerted by the quantity of fluid that remains trapped in the annular space 50 between the fist seal ring 30 and the second seal ring 6.

Figures 5, 6, 7:
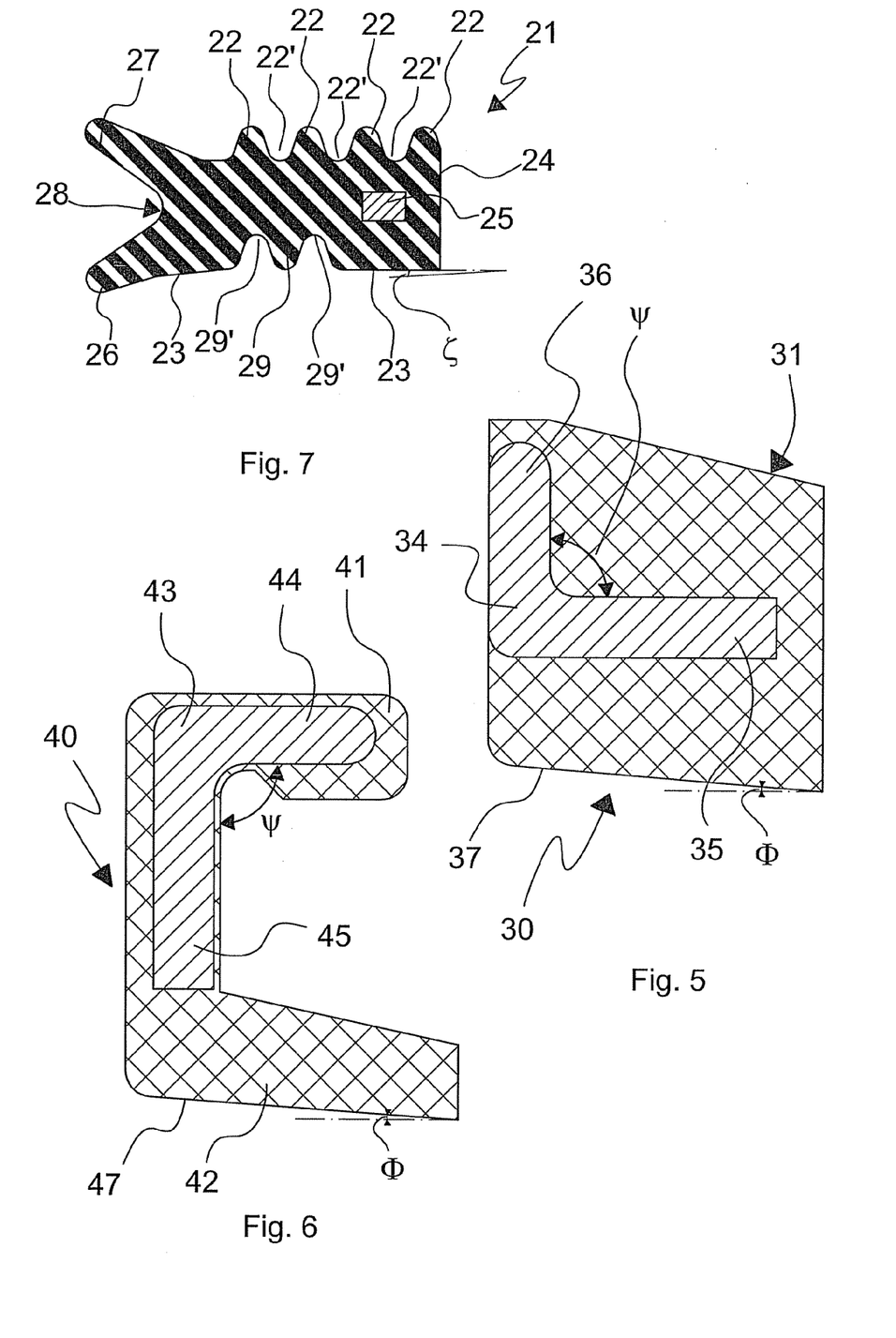

With particular reference to the FIG. 5, the seal ring 30 has a reinforcement ring 34 embedded in its body. The reinforcement ring 34 has a cross section, viewed in projection on an axial plane, of L-shape with two arms 35, 36 perpendicular to each other. The angle $\psi$ of the L-shape can also be slightly larger or smaller than 90° and alternately the two arms 35, 36 can be of different length depending on the wrapping force that must be exerted on the pin 2, on the magnitude of the external fluid pressure that is exerted in the operative environment of the joint and on the final location that has to be reached by the ring after its initial sliding towards the internal part of the joint under action of the external fluid.

Figure 4:
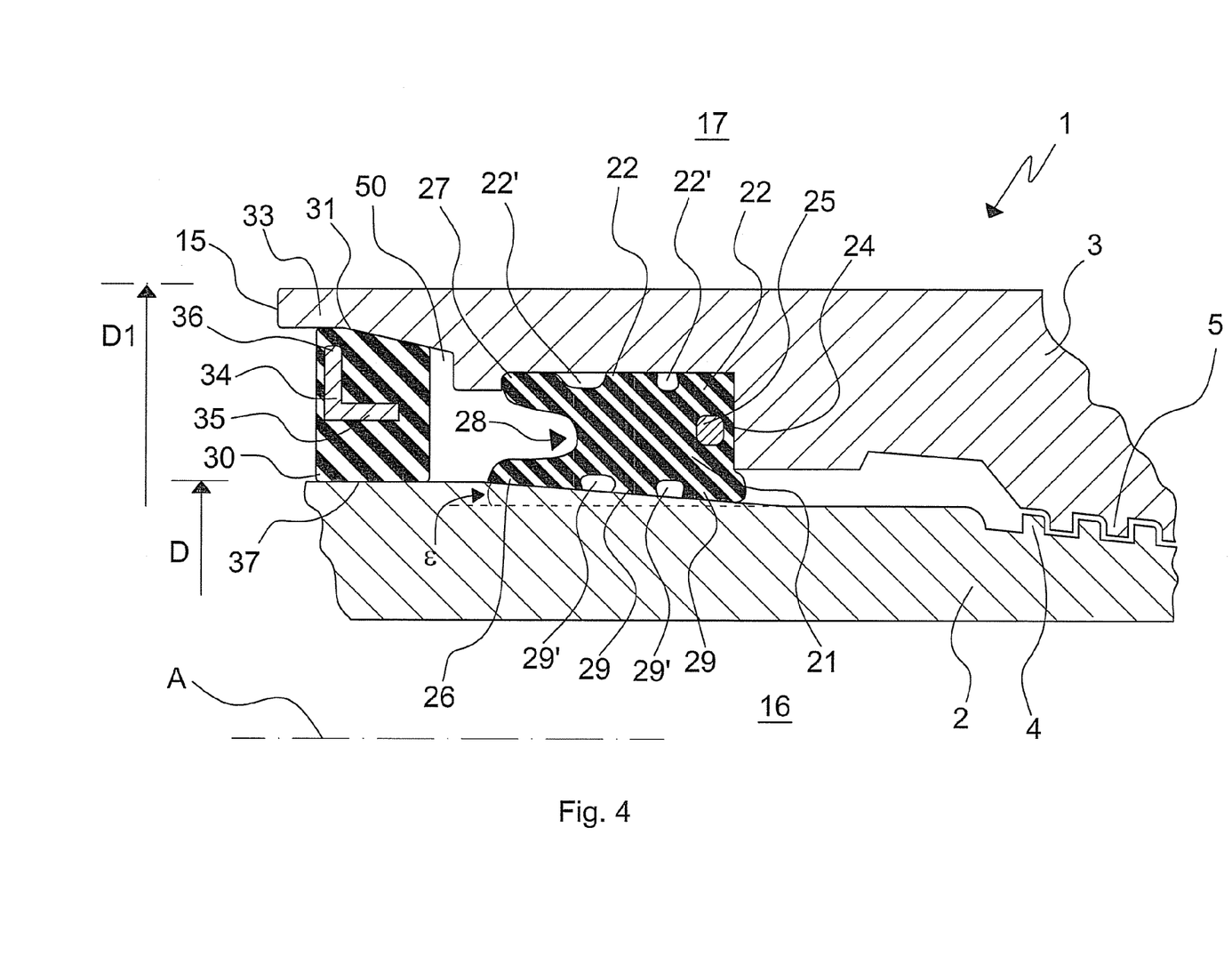
FIG. 4 shows a sectional view of a second embodiment of the joint projected on an axial plane in accordance with the present invention with two seal rings mounted, FIGS. 5 and 6 respectively show sectional views of two different embodiments of one seal ring of the joint of FIGS. 2 and 4.

Preferably the reinforcement ring 34 is positioned as shown in FIGS. 2 and 4, i.e. with the arm 35 parallel to the axis of the seal ring 30 and the arm 36 perpendicular to the axis of said ring 30. The axis of the seal ring 30 is the same common axis A of pin 2 and box 3.

FIG. 6 shows a second embodiment of the first seal ring 40 having a U-shaped cross section, with the external arm 41 preferably shorter than the internal arm 42. The reinforcement ring 43, embedded in the body of the seal ring 40, has an L-shaped cross section, viewed in projection on an axial plane, with two arms 44, 45 perpendicular to each other. The angle $\psi$ of the L-shape can also be slightly larger or smaller than 90° and the two arms 44, 45 can be of different length. The arm 44 is embedded in the external arm 41 of the body of the seal ring 40 parallel to the joint axis A, whereas the arm 45 is embedded in the body of the seal ring 40 perpendicularly to the joint axis A.

The reinforcement ring in both embodiments of the first seal ring can be completely embedded in the seal ring or can have one of its surfaces exposed to the exterior of the seal ring, either flush to a base or protruding from this base.

Advantageously the internal surface 37, 47 of the first seal ring 30, 40 has a frustoconical shape with a very slight taper, of an angle $\phi$ lower than 10°.

The portion of the box 3 near the end of the thread 5 comprises an annular groove 18 between box nose 15 and the thread end. This groove 18 is the housing for the second seal ring 6.

With particular reference to FIG. 3, which shows a section through the internal or second seal ring 6 in the unloaded position located in its housing 18 in the box 3, the seal ring 6 has an external surface with two annular ribs 11, 12 separated by an annular furrow 13. The ribs 11, 12 have crests preferably rounded or of any other appropriate shape. When positioned in the housing 18 the external surface of the second seal ring 6 contacts the bottom of the groove. This bottom is preferably flat in the axial direction in order to make machining easier.

The furrow 13 and the ribs 11, 12 have two main advantages:
  on the one hand the furrow 13 works as a lung, providing the needed radial deformation to allowing the internal surface of the second seal ring 6 to be squeezed more easily;
  on the other hand the ribs 11, 12 generate a load concentration, thus increasing sealing contact and acting as double independent sealing barriers. The seal ring 6 has two bases 8, 9 axially opposite to each other. One or both bases 8, 9 are substantially, but not exclusively, flat.

The internal surface of the second seal ring 6 has two frustoconical surfaces or flanks 19, 20 that are V-shaped, when seen in axial section. The taper angle $\alpha$ of the surfaces 19, 20 can be defined as a function of thread parameters, i.e. taper, stab angle, etc. A preferred value for the angle $\alpha$ is 45°.

The taper angle of each surface 19 and 20 can also have different values $\alpha$ and $\gamma$. This embodiment is shown in particular in FIG. 3.

In a further particularly advantageous embodiment of the joint, the second seal ring 6 has a section with specific dimensions.

The thickness "t" of the seal ring 6 in the axial direction is defined by the thread width, the thickness "t" of the ring 6 being larger than the axial length of the void "b" (FIG. 1) between two crests of the thread. This facilitates jump over of the crests by the seal ring apex 10 during make up.

The depth "d" of the groove 18 of the box 3 in the radial direction is preferably between 3 and 15 mm. The groove 18 should house about 75% of the thickness of the second seal ring 6 in the radial direction, when the latter is in the unloaded position.

The taper angles $\alpha$ and $\gamma$ of the flanks 19 and 20 are chosen with sizes such that the following relationships with the stab angle $\beta$ and load angle $\delta$ of the thread flanks are satisfied: $\alpha > \beta$ and $\gamma > \delta$.

The apex 10 of the seal ring 6, where the two tapered frustoconical surfaces 19 and 20 meet, has preferably a rounded shape like a fillet when seen in section. The second seal ring 6 is a simple but effective improvement over conventional O-rings currently used in the field. Main advantages are its frustoconical annular surfaces 19, 20, tapering towards the center of the seal ring and joined by the apex or fillet 10 therebetween, which facilitate forward or backward movement of the seal ring over the threads, thus avoiding damage. Moreover, the internal surface of the seal ring 6 also generates a load concentration, thus increasing sealing contact and improving sealability of the seal ring 6 when made up.

This seal ring 6 can advantageously have a reinforcement ring 7 of different cross sections embedded in its body.

With particular reference to FIG. 4, where the same features of the embodiments described above are indicated by the same reference numerals, there is shown a second embodiment of the joint according to the invention. The first seal ring 30, positioned in an external region of the joint 1, is associated with a second seal ring 21 positioned more internally within the joint. The cross sectional shape of the seal ring 21 is configured to provide several improved sealing functions.

The seal ring 21 has a main body on which one or more annular ribs 22 are externally provided separated by annular grooves 22'. At that extremity which is closer to the threaded portions 4, 5 of pin and box, the seal ring 21 has a base 24 substantially, but not necessarily, flat.

Close to the base 24 there is provided a reinforcement ring 25, of another material which has greater stiffness, preferably but not exclusively metal.

The reinforcement ring 25 can be completely embedded in the seal ring 21 or can have one of its surfaces exposed to the exterior of the seal ring 21, either flush to the base 24 or protruding from said base 24. The reinforcement ring 25 can advantageously have various cross section shapes.

At its longitudinally opposite end with respect to the base 24 the seal ring 21 has two annular lips 26, 27 which respectively protrude beyond the perimeter of the ring 21 in respective skewed directions with respect to the axis A, when considered in an unloaded position as illustrated in FIG. 7. In the space defined between the two annular lips 26 and 27 an annular groove is defined, which in axial section appears as a V-shaped mouth 28.

In a first embodiment the internal surface 23 of the seal ring 21, as shown in FIG. 7, is undulated in an axial direction and comprises at least one annular rib 29 separated by annular grooves 29', in a section projected on an axial plane.

In another embodiment (not shown) the internal surface 23 of the seal ring 21 is without abrupt variations. In this case it can have a cylindrical shape, or alternately a rounded or toroidal shape or a frustoconical shape with an angle of conicity $\zeta$ of the surface 23 with reference to the axis A of about 3°. This facilitates mounting of the ring 21 on the pin 2.

By virtue of the reinforcement ring 25, like the previous embodiments of the joint described above, the seal ring 21 exerts a wrapping force which presses its internal surface against the external pin surface, thus enhancing tightness between seal ring 21 and the external surface of the pin 2.

This wrapping force exerted by the seal ring 21 can be further enhanced by the small taper of the surface of the pin 2 in the region designed for the second seal ring 21 after make up is complete. The surface of this region can be inclined to the axis A by an angle $\epsilon$ smaller than 15°, preferably 3°. This has the function of preventing the seal ring 21 from slipping away from its position during operation by opposing an increased gripping force. In this case, the seal ring 21 is kept in place by both frictional forces and an increasing hoop stress generated by the conicity of the pin surface.

Figure 8:
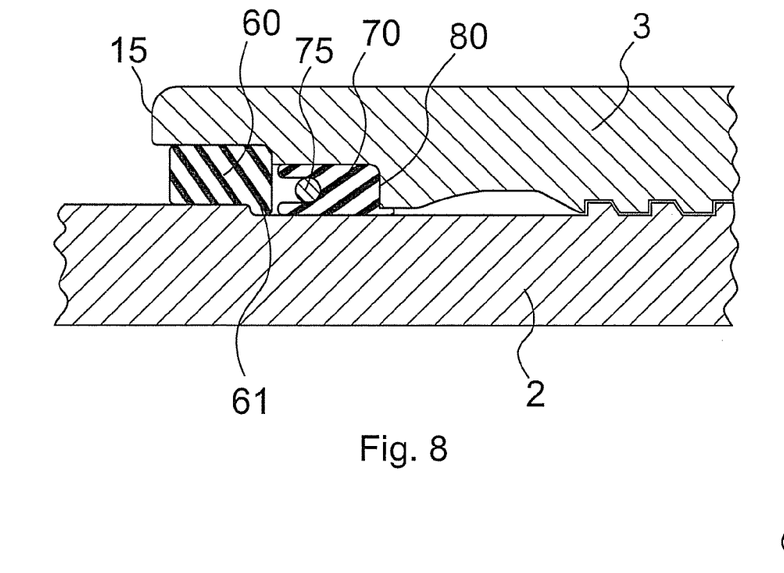
FIG. 8 shows a sectional view of a third embodiment of the joint projected on an axial plane in accordance with the present invention with two seal rings mounted.

With particular reference to FIG. 8, where the same features of the embodiments described above are indicated by the same reference numerals, there is shown a third embodiment of the joint according to the invention.

At the extremity of the box 3 there is located the first seal ring 60 of elastomeric material. This seal ring 60 has a cross section on an axial plane substantially rectangular and provided with a small rib 61 in correspondence with an edge of said cross section. The small rib 61 (FIG. 8) is the section of an annular protuberance protruding in the radial direction.

The seal ring 60 can also be provided with a reinforcing ring, for example having a cross section of L-shape, completely embedded in the seal ring or having one of its surfaces exposed to the exterior of the seal ring, either flush to a base or protruding from this base.

The internal surface of the nose 15 of the box 3 has a cylindrical shape complementary to the shape of the external surface of the seal ring 60.

The external surface of the region of the pin 2, where said ring 60 is housed before make-up, has also a cylindrical shape but it is provided with an annular recess or step in order to hold the rib 61 in a stable way.

Also in this embodiment of the invention the first seal ring is advantageously premounted on the pin 2, thus avoiding damage of this seal ring during make-up.

As regards the second seal ring 70, in this third embodiment of the joint, it is also pre-mounted on the pin before make-up.

Figure 9:
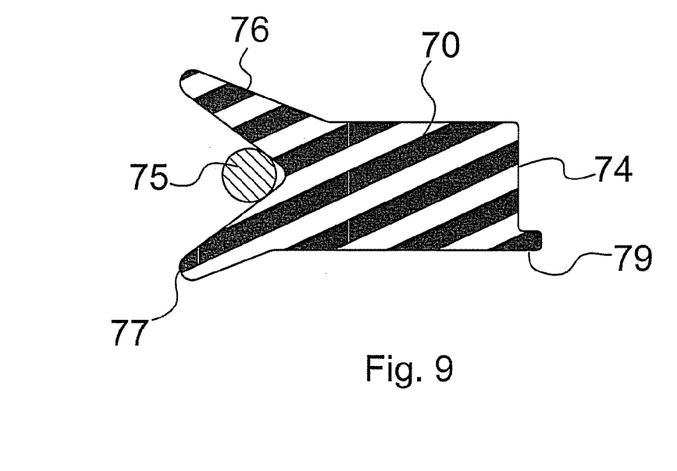
FIG. 9 shows a seal ring of the joint of FIG. 8 in an unloaded position.

This second seal ring 70 is shown mounted on the joint in an unloaded position in FIG. 9. The cross sectional shape of the seal ring 70 is configured to provide improved sealing functions.

It is provided with a base 74 adapted to abut on a shoulder 80 of the box 3. At its longitudinally opposite end with respect to the base 74 the seal ring 70 has two annular lips 76, 77 which respectively protrude beyond the perimeter of the ring 70 in respective skewed directions with respect to the axis A, when considered in the unloaded position of FIG. 9. In the space defined between the two annular lips 76 and 77 an annular groove is defined, which in axial section appears as a V-shaped mouth.

This annular groove advantageously houses a reinforcement ring 75, firmly fitted in said groove. The ring 75 preferably has a circular cross section and is made of material different from an elastomer but of greater stiffness, preferably but not exclusively metal.

By virtue of the reinforcement ring 75, like the previous embodiments of the joint described above, the seal ring 70 exerts a wrapping force which presses its internal surface against the external pin surface, thus enhancing tightness between seal ring 70 and the external surface of the pin 2.

The second seal ring 70 is also provided with its own annular rib 79 in correspondence with an edge of the base 74. This annular rib 79 is able during make-up to engage between the internal surface of the box 3, underneath the shoulder 80, and the external surface of the pin 2 in order to further improve sealing.

In FIGS. 8 and 9 both external and internal surfaces of the seal ring 70 are without abrupt variations. In this case they can have a cylindrical shape, or alternately a rounded or toroidal shape or a frustoconical shape.

However, in other possible embodiments, the seal ring 70 may have its main body provided externally and/or internally with one or more annular ribs separated by annular grooves, as in the section projected on an axial plane of FIG. 7.

The combination of an embodiment of the first or external seal ring 30, 40, 60 with any of the described embodiments of the internal or second seal ring 6, 21, 70 offers an optimal protection to the joint 1. Both first and second seal rings, which are located at the extremity of the box, combine their individual sealing functions to prevent external fluids which occupy the space 17 external to the joint from leaking into the threaded zone of the joint 1.

The seal rings described can be made of elastomeric materials, which in this application is intended to include any natural or synthetic material having elastic properties including rubbers, plastics, polymers, etc.

The reinforcement rings, completely or partially embedded or firmly fitted in the body of the seal rings in any of the embodiments illustrated above, are made of various materials, preferably metal, stronger than the elastomeric material of the seal rings. For example, the reinforcement rings can be made of aluminium, copper, silver, nickel, steel, or stainless steel. Some reinforcement rings are plated or coated with cadmium, copper, nickel, silver, gold, or indium. Others are heattreated, age-hardened or annealed. Preferably the radial thickness of the reinforcement rings must always be smaller than the radial thickness of the elastomeric seal rings, in order to allow deformation of the elastomer, when compressed in the space between pin and box.

Advantageously a coating is applied to those surfaces of both the pin and box which remain in contact with the first and second seal rings in the various embodiments.

The threaded joint of the invention thus offers improved sealability and protection against make up and break-out damage by virtue of the aforementioned features. The joint is to be used preferably in the field of OCTG and line pipe connections for the oil & gas industry, especially in offshore applications. It can be employed at depths up to 3500 m, at which the threaded part still remains protected from external water infiltration.

The FIGS. 2, 4 and 8 schematically show the joint with the seal rings in a loaded position. Therefore, the shape of the seal rings could be different from that shown, in accordance with the different load conditions.

The invention claimed is:

1. A threaded joint comprising:
a male threaded pin, a female threaded box, the pin being configured to be made up in the box, pin and box defining a common longitudinal axis;
a first seal ring and a separate second seal ring interposed between the pin and the box, and located in a portion of the surface of the box between the end of a threaded portion of the box and a nose of the box, and wherein when the pin and box are made up each of the first and second seal rings are in tight sealing contact with the pin and the box by a respective radially external surface on one side with an internal surface of the box and a respective radially internal surface with an external surface of the pin; and
the internal surface of the box being provided with a first recess made in proximity to the nose of the box for housing the first seal ring and with a second recess made within its thickness for housing the second seal ring positioned between the first recess and the threaded portion of the box, the first recess being spaced apart along the longitudinal axis from the second recess.

2. The threaded joint according to claim 1, wherein the first seal ring has a radially external surface of frustoconical shape.

3. The threaded joint according to claim 2, wherein the radially internal surface of the first seal ring has a frustoconical shape.

4. The threaded joint according to claim 1, wherein the first seal ring has a radially external surface of cylindrical shape.

5. The threaded joint according to claim 4, wherein the radially internal surface of the first seal ring has a cylindrical shape provided with an annular rib in correspondence with an edge.

6. The threaded joint according to claim 1, wherein the internal surface of the second seal ring comprises, when in an unloaded position, two frustoconical annular surfaces tapering towards the center of said second seal ring and joined by a fillet.

7. The threaded joint according to claim 6, wherein said frustoconical annular surfaces have respective taper angles ($\alpha$, $\gamma$) of different or equal value.

8. The threaded joint according to claim 7, wherein said frustoconical annular surfaces have angles ($\alpha$, $\gamma$) with values satisfying the relationship $\alpha > \beta$ and $\gamma > \delta$, where $\beta$ is the stab angle and $\delta$ is the load angle of thread flanks of the threaded portion.

9. The threaded joint according to claim 8, wherein the second seal ring has two protruding annular ribs on its external surface.

10. The threaded joint according to claim 9, wherein the first seal ring has two substantially flat bases, opposite to each other.

11. The threaded joint according to claim 1, wherein the second sealing ring has at least two protruding annular lips positioned at a skewed angle to the axis.

12. The threaded joint according to claim 11, wherein the second seal ring has one or more protruding annular ribs at least on its external surface.

13. The threaded joint according to claim 11, wherein the second seal ring is provided with its own annular rib in correspondence with an edge of a base.

14. The threaded joint according claim 1, wherein a reinforcement ring is provided in the first seal ring or in the second seal ring.

15. The threaded joint according to claim 14, wherein the reinforcement ring has an L-shaped cross section when projected on an axial plane.

16. A threaded joint comprising:
a male threaded pin, a female threaded box, the pin being configured to be made up in the box, pin and box defining a common longitudinal axis;
a first seal ring and a separate second seal ring interposed between the pin and the box, and located in a portion of the surface of the box between the end of a threaded portion of the box and a nose of the box, and wherein when the pin and box are made up each of the first and second seal rings are in tight sealing contact with the pin and the box by a respective radially external surface on one side with an internal surface of the box and a respective radially internal surface with an external surface of the pin;
wherein the internal surface of the second seal ring comprises, when in an unloaded position, two frustoconical annular surfaces tapering towards the center of said second seal ring and joined by a fillet; and
the internal surface of the box being provided with a first recess made in proximity to the nose of the box for housing the first seal ring and with a second recess made within its thickness for housing the second seal ring positioned between the first recess and the threaded portion of the box.

17. The threaded joint according to claim 16, wherein said frustoconical annular surfaces have respective taper angles ($\alpha$, $\gamma$) of different or equal value.

18. The threaded joint according to claim 17, wherein said frustoconical annular surfaces have angles ($\alpha$, $\gamma$) with values satisfying the relationship $\alpha>\beta$ and $\gamma>\delta$, where $\beta$ is the stab angle and $\beta$ is the load angle of thread flanks of the threaded portion.

19. The threaded joint according to claim 18, wherein the second seal ring has two protruding annular ribs on its external surface.

20. The threaded joint according to claim 19, wherein the first seal ring has two substantially flat bases, opposite to each other.

* * * * *

UNITED STATES PATENT AND TRADEMARK OFFICE
CERTIFICATE OF CORRECTION

PATENT NO. : 8,262,140 B2  
APPLICATION NO. : 12/920085  
DATED : September 11, 2012  
INVENTOR(S) : Santi et al.

Page 1 of 1

It is certified that error appears in the above-identified patent and that said Letters Patent is hereby corrected as shown below:

In column 1 at line 9, change "2009" to --2009,--.

In column 6 at line 35-37, delete "The seal. . . flat." And insert the same below "barriers." on Col. 6, Line 36, as a new paragraph.

In column 11 at line 2, In Claim 18, change "β" to --δ--.

Signed and Sealed this  
Twenty-sixth Day of February, 2013

Teresa Stanek Rea  
*Acting Director of the United States Patent and Trademark Office*